US012739236B2

(12) United States Patent
Gordon et al.

(10) Patent No.: US 12,739,236 B2
(45) Date of Patent: Sep. 15, 2026

(54) COMPOSITE IDENTITY FOR ACCESSING NETWORK-BASED SERVICES

(71) Applicant: Microsoft Technology Licensing, LLC, Redmond, WA (US)

(72) Inventors: Ariel Nicolas Gordon, Brooklyn, NY (US); Muhammad Ali Malik, Sammamish, WA (US); Kundan Bharti, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 18/905,977

(22) Filed: Oct. 3, 2024

(65) Prior Publication Data

US 2026/0100941 A1 Apr. 9, 2026

(51) Int. Cl.
*H04L 9/40* (2022.01)

(52) U.S. Cl.
CPC ........ *H04L 63/0807* (2013.01); *H04L 63/102* (2013.01)

(58) Field of Classification Search
CPC .......................... H04L 63/0807; H04L 63/102
USPC .............................................................. 726/9
See application file for complete search history.

(56) References Cited

U.S. PATENT DOCUMENTS 8,800,003 B2 * 8/2014 Guo .................... H04L 63/0823 726/4
9,418,213 B1 * 8/2016 Roth ....................... H04L 63/08
9,466,051 B1 * 10/2016 Roth .................... G06F 21/6218
10,097,558 B2 * 10/2018 Roth ..................... G06F 21/335
10,992,657 B1 * 4/2021 Stevens ................. H04L 63/102
11,503,037 B2 * 11/2022 Gordon ................. H04L 63/105
2009/0300744 A1 * 12/2009 Guo ........................ G06F 21/34 726/7
2015/0341368 A1 * 11/2015 Roth ....................... G06F 21/00 726/4
2016/0352753 A1 * 12/2016 Roth ....................... H04L 63/08
2018/0300803 A1 * 10/2018 Giannini ............ G06Q 30/0283
2019/0182262 A1 * 6/2019 Raposa ................. H04L 63/108
2019/0372962 A1 * 12/2019 Maria ................... H04L 63/108
2020/0250664 A1 * 8/2020 Kumar ................ H04L 63/0838
2020/0267090 A1 8/2020 Cahill
2021/0136083 A1 * 5/2021 Gordon ............... H04L 63/0884
2022/0385657 A1 * 12/2022 Vivek Mudhenahalli Rajanna .... H04L 63/0876

OTHER PUBLICATIONS

M. Jones, "RFC 8693 OAuth 2.0 Token Exchange" Internet Engineering Task Force (IETF), Published on Jan. 2020.*
Extended European search report Received for European Application No. 25203460.8, mailed on Feb. 12, 2026, 12 pages.

* cited by examiner

*Primary Examiner* — Samson B Lemma
(74) *Attorney, Agent, or Firm* — Schwegman Lundberg & Woessner, P.A.

(57) ABSTRACT

Access management in a network-based service involves identifying an action involving a first account and determining if an account policy forbids the action. If forbidden, the system identifies an identity data structure linking the first account with a second account of a different type. The system determines if the second account allows the action, sends a transmission to the user's device identifying the second account, and receives an access token. If the token is valid, the system performs the action. The system may also create a new account if policies allow.

20 Claims, 11 Drawing Sheets

COMPOSITE IDENTITY FOR ACCESSING NETWORK-BASED SERVICES

TECHNICAL FIELD

Embodiments pertain to network-based identity management. Some embodiments relate to composite identity data structures. Some additional embodiments relate to using the composite identity structures to provide improved user interfaces. Some additional embodiments relate to using the composite identity structures to provide secure and efficient resource access in multi-tenant environments.

BACKGROUND

Network-based services encompass a wide range of functionalities, including compute, storage, communications, and other services that leverage network computing technology to offer enhanced productivity, security, and flexibility. These services enable organizations and individuals to access and manage resources remotely, providing the infrastructure needed for various applications and workflows. Network-based services can include cloud computing platforms, data storage solutions, and software-as-a-service (SaaS) applications, among others. These services often provide scalable and efficient solutions for handling large volumes of data, running complex computations, and ensuring secure access to resources.

Within the broader category of network-based services, network-based collaboration systems have transformed the way organizations and individuals work together by providing a platform for seamless communication, document sharing, and project management. These systems leverage network computing technology to offer a range of features and benefits that enhance productivity, security, and flexibility. Network-based collaboration systems often provide quick access to shared documents and resources, enabling team members to share content easily and ensuring that everyone is always on the same page. In some examples, collaboration changes made by one user may be visible to others, reducing the risk of version conflicts and improving overall efficiency.

Subject to security policies, many network-based services have the capability to allow users to have access to resources of the network-based services from any device with a network connection, whether they are in the office, at home, or on the go. This flexibility supports remote work and allows teams to collaborate effectively regardless of their physical location. Resources of the network-based service refer to any assets, tools, or functionalities provided by the service that users can access and utilize. These include data storage, compute power, communication tools, applications and software, content and document sharing, security services, networking services, development and deployment tools, analytics and reporting, and support and maintenance services.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
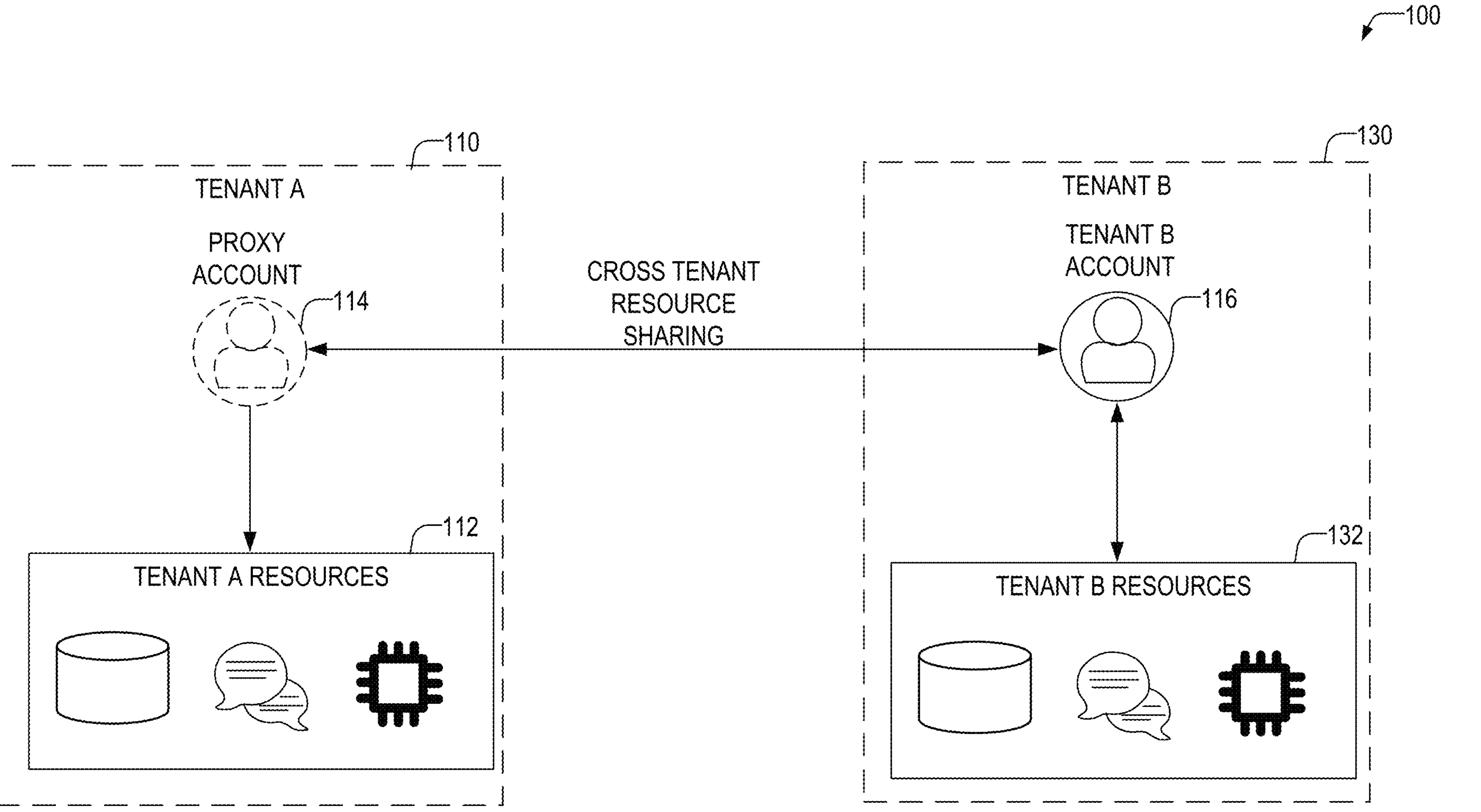
FIG. 1 shows a diagram of an account in the form of tenant B account from tenant B accessing resources in tenant A through a proxy account according to some examples of the present disclosure.

Network-based collaboration systems are often designed around the principle of tenant isolation to ensure that an organization's resources are secure. A "tenant" is a dedicated instance of the software environment that is isolated for a specific organization. Each tenant operates as a separate, secure space where the organization's data and resources are stored and managed. This isolation ensures that data within one tenant is not accessible to users from another tenant, thereby providing a robust security guarantee.

However, the need for inter-organizational collaboration complicates this model. Organizations frequently need to share resources, such as files or project spaces, with external users who belong to different tenants. One approach to external access is to directly authorize resources in one tenant to be accessible by users from another tenant. This solution poses significant challenges in configuring and enforcing access policies as there may be no straightforward way to attach specific policies to external users, making it difficult to ensure compliance with security requirements such as multi-factor authentication (MFA) or device compliance.

Another approach to solving this problem involves creating proxy or shadow accounts that allow access to these resources in a controlled manner. A proxy account is a secondary identity created within the resource tenant to represent an external user which provides access to resources in the second tenant. The proxy account is linked to the user's primary account in a separate tenant. For example, if an employee from a first entity having a first tenant on a network-based service needs access to a file in a second tenant of a second entity, a proxy account for the employee of the first entity is created within the second tenant. This allows the external user to access resources in the second tenant using an access token associated with the proxy account. Proxy accounts may be of different types and each type may have different access permissions. For example, proxy accounts include "external" and "guest" type accounts. External accounts are not members of the first tenant, but they allow access to certain features, such as chat and call features of the first tenant but not group communications or sharing of files. In contrast, guest accounts are members of the first tenant and can access chat, call, group communication, and file sharing features.

While proxy accounts provide a way to manage external access to resources, they introduce several complexities. One complexity is the proliferation of multiple different types of accounts for the same user. This can lead to a fragmented user experience where the same individual appears as multiple distinct entities in the system. For instance, in an application like Microsoft Teams, a user might show up in search results as both "Alice (External)" and "Alice (Guest)," corresponding to her different proxy accounts. Another challenge is the management of access policies and permissions. Each identity and each resource managed by a tenant may have different access tokens, privileges, and security requirements. For example, a user with multiple identities on a tenant may have to switch accounts to view or access one or more resources. This fragmentation can confuse users and complicate the management of access policies and permissions.

Disclosed in some examples are methods, systems, and machine-readable mediums for creating and utilizing a composite identity data structure that aggregates information on multiple proxy accounts representing a same user into a single composite identity data structure. The composite identity data structure may link to one or more proxy accounts that describe a same user. This composite structure may be referenced when making access decisions for resources and the composite structure may be used for providing user information in a user interface.

In some examples, the system employs rules to determine different proxy accounts that belong to a same person. These accounts are then linked together in a composite identity data structure. When a user attempts to access a resource with a user in another tenant, the system may first determine whether the current account the user is using to access the tenant allows the access. If not, the system searches for a composite identity data structure. If a composite identity data structure is found and another account in the composite identity data structure would allow access, the system tells the user's client software to use the other account. The client software then sends the access token of the other account to access the resource. This method effectively stitches together the various proxy accounts of a user to seamlessly offer the user access to the tenant's resources.

If there is no composite identity data structure, or if there is not another proxy account in the composite identity data structure that allows access to the resource, the system may utilize just-in-time (JIT) account provisioning to automatically create another proxy account for the user of a type that allows access to the requested resource. This automatic account creation may be transparent to the user and may be done in response to accessing a resource that their current proxy accounts do not allow, but a different type of proxy account would allow (e.g., creating a guest account to access a communication group when the user only has an external account which only allows for chat communications).

In some examples, the composite identity data structure may also be used to enhance various user interfaces (UI) in the network-based service by presenting data about the user in a unified manner. By aggregating multiple account profile information into a single composite identity data structure, the system can present a more complete and coherent profile of the user. This aggregated profile may include consolidated attributes such as profile picture, online presence, location, and job title. This aggregated information ensures that users and administrators have access to the most relevant and up-to-date information. Additionally, the composite identity structure simplifies the search interface by eliminating the confusion caused by multiple identity representations. Instead of displaying separate entries for each proxy or shadow account, the system collapses these identities into a single, unified search result. This not only streamlines the user experience but also reduces the cognitive load on users, making it easier to find and interact with the correct individual across different tenants and resources. These UI improvements contribute to a more intuitive and efficient collaboration environment, enhancing overall productivity and user satisfaction.

The technical problem addressed by this invention is the complexity and inefficiency in securing resources within tenants in network-based collaboration systems. Traditional approaches, such as creating proxy or shadow accounts for external users, lead to fragmented user experiences and complicate access to resources as well as enforcement of consistent access policies and permissions. This fragmentation can result in users appearing as multiple distinct entities within the system, causing confusion and increasing the administrative burden on IT departments. The technical solution provided by this invention involves the creation and utilization of a composite identity data structure that aggregates multiple digital identities representing the same user into a single, unified profile. This composite identity structure employs heuristics to determine which identities correspond to each other, and which identity to use based on specific resource requests. By consolidating various proxy accounts into a single composite identity, the system can seamlessly manage access to resources, enforce consistent security policies, and present a coherent user interface. This solution not only simplifies identity management but also enhances the user experience by providing a unified and intuitive representation of the user across different tenants and resources.

FIG. 1 shows a diagram 100 of user from tenant B 130 accessing resources 112 in tenant A 110 through a proxy account according to some examples of the present disclosure. Tenant A 110 includes tenant A resources 112 and a proxy account 114. Tenant A resources 112 represent the data and services available within tenant A 110. Examples include content, communications, compute, and the like. The proxy account 114 is a secondary identity created within tenant A 110 to represent an external user from tenant B 130. This proxy account 114 facilitates access to tenant A resources 112 by external users.

Tenant B 130 includes tenant B resources 132 and tenant B account 116. Tenant B resources 132 represent the data and services available within tenant B 130. Tenant B account 116 is the primary identity of a user within tenant B 130 and allows the user to access tenant B resources 132. The diagram illustrates tenant resource sharing, where tenant B account 116 accesses tenant A resources 112 through proxy account 114. This setup allows users from tenant B 130 to access resources in tenant A 110 securely and efficiently. The proxy account 114 acts as an intermediary, ensuring that access policies and permissions are maintained while enabling collaboration between different tenants.

Figure 2:
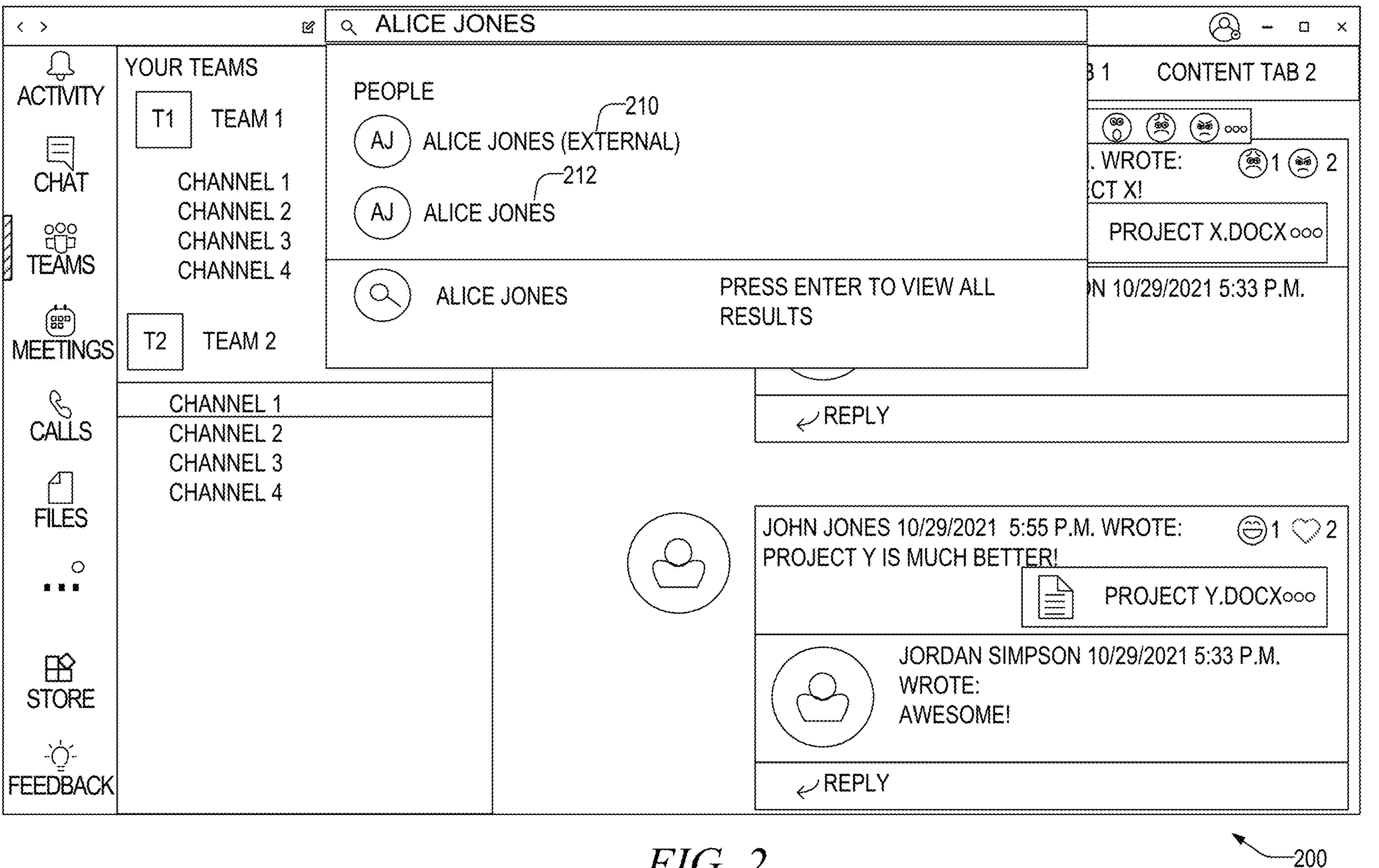
FIG. 2 shows a Graphical User Interface of a network-based service client application with a search box where the user has searched for another user according to some examples of the present disclosure.

FIG. 2 shows a Graphical User Interface 200 of a network-based service client application with a search box where the user has searched for another user. The figure illustrates the multiple results for a same person where that same person has multiple accounts. The left panel of the Graphical User Interface 200 includes various navigation options such as Activity, Chat, Teams, Meetings, Calls, Files, Store, and Feedback. These options allow the user to navigate through different functionalities of the network-based service client application. The main content area of the Graphical User Interface 200 displays various channels and teams that the user is a part of, such as Team 1 and Team 2, with their respective channels listed below. This area also includes a section for displaying messages and files shared within the selected channel or team.

The Graphical User Interface 200 displays a search result for the query "ALICE JONES." The search results include multiple entries for the same individual, Alice Jones, represented by different identities. The first result is Alice Jones (External) 210, which indicates an external identity of Alice Jones. The second result is Alice Jones 212, which represents another identity of the same person within the system. The search results are presented in a dropdown list under the search box, providing the user with options to select the appropriate identity of Alice Jones based on the context of their interaction. The interface also includes a prompt to "PRESS ENTER TO VIEW ALL RESULTS," indicating that additional results may be available beyond those currently displayed.

Figure 3:
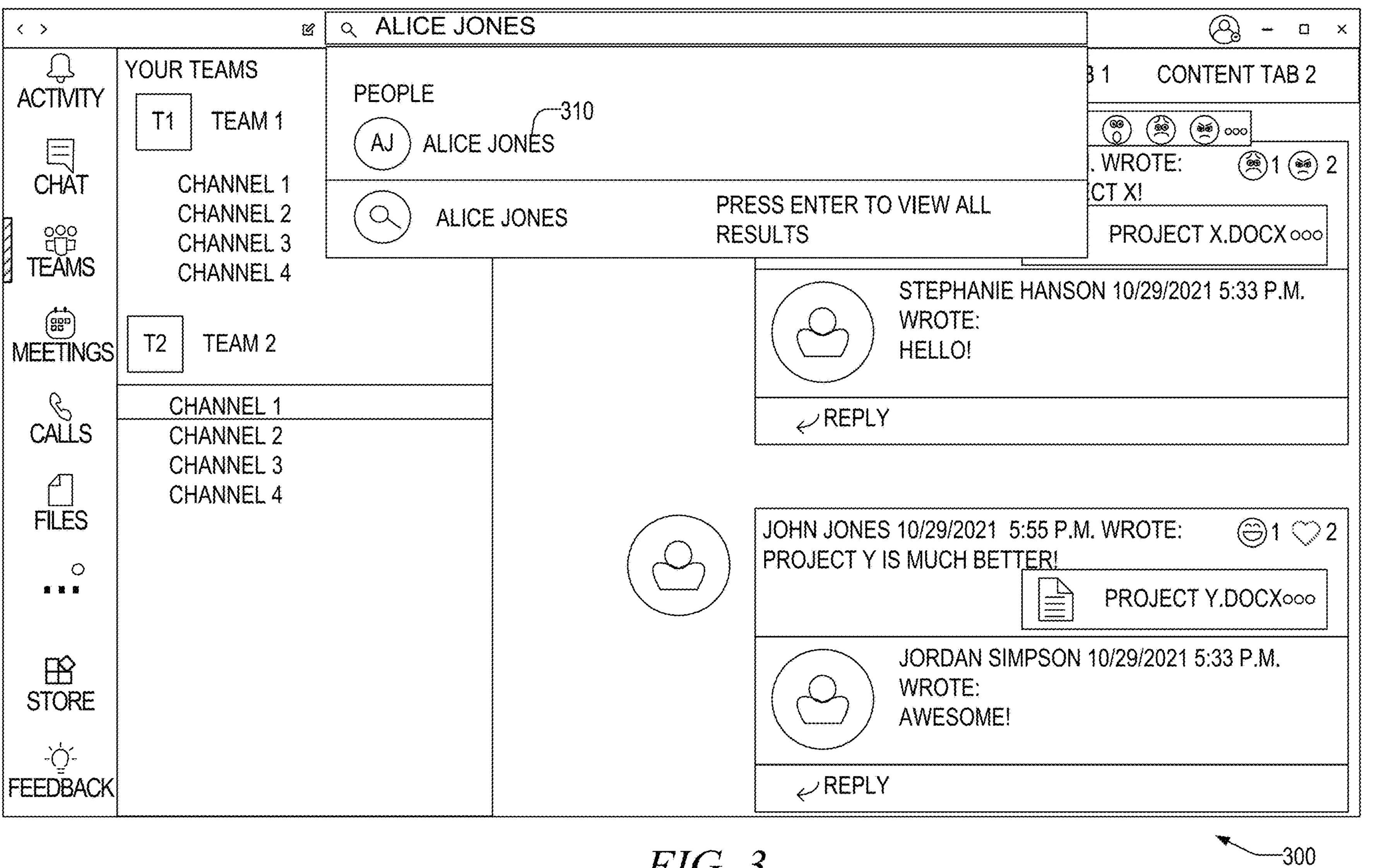
FIG. 3 shows a Graphical User Interface of a network-based service client application with a search box where the user has searched for another user according to some examples of the present disclosure.

FIG. 3 shows a Graphical User Interface 300 of a network-based service client application with a search box where the user has searched for another user. As with FIG. 2, the left panel of the GUI 300 includes various navigation options such as Activity, Chat, Teams, Meetings, Calls, Files, Store, and Feedback. These options allow the user to navigate through different functionalities of the network-based service client application. Under the Teams section, the interface displays the user's teams, such as Team 1 and Team 2, with their respective channels listed below. For example, Team 1 includes Channel 1, Channel 2, Channel 3, and Channel 4.

The figure illustrates the multiple results for the same person of FIG. 2 have been consolidated to show a single result using the composite identity data structure. The Graphical User Interface 300 includes a search box at the top where the user has entered the query "ALICE JONES." The search results are displayed below the search box, showing a single consolidated result for Alice Jones 310 despite their being multiple accounts for this person (as was shown in FIG. 2). This result represents the composite identity of Alice Jones, combining her multiple identities into one unified representation. The Graphical User Interface 300 effectively consolidates multiple identities of the same user into a single composite identity, simplifying the user experience and reducing confusion. This unified representation allows users to interact with the correct individual across different tenants and resources without encountering multiple fragmented identities.

Figure 4:
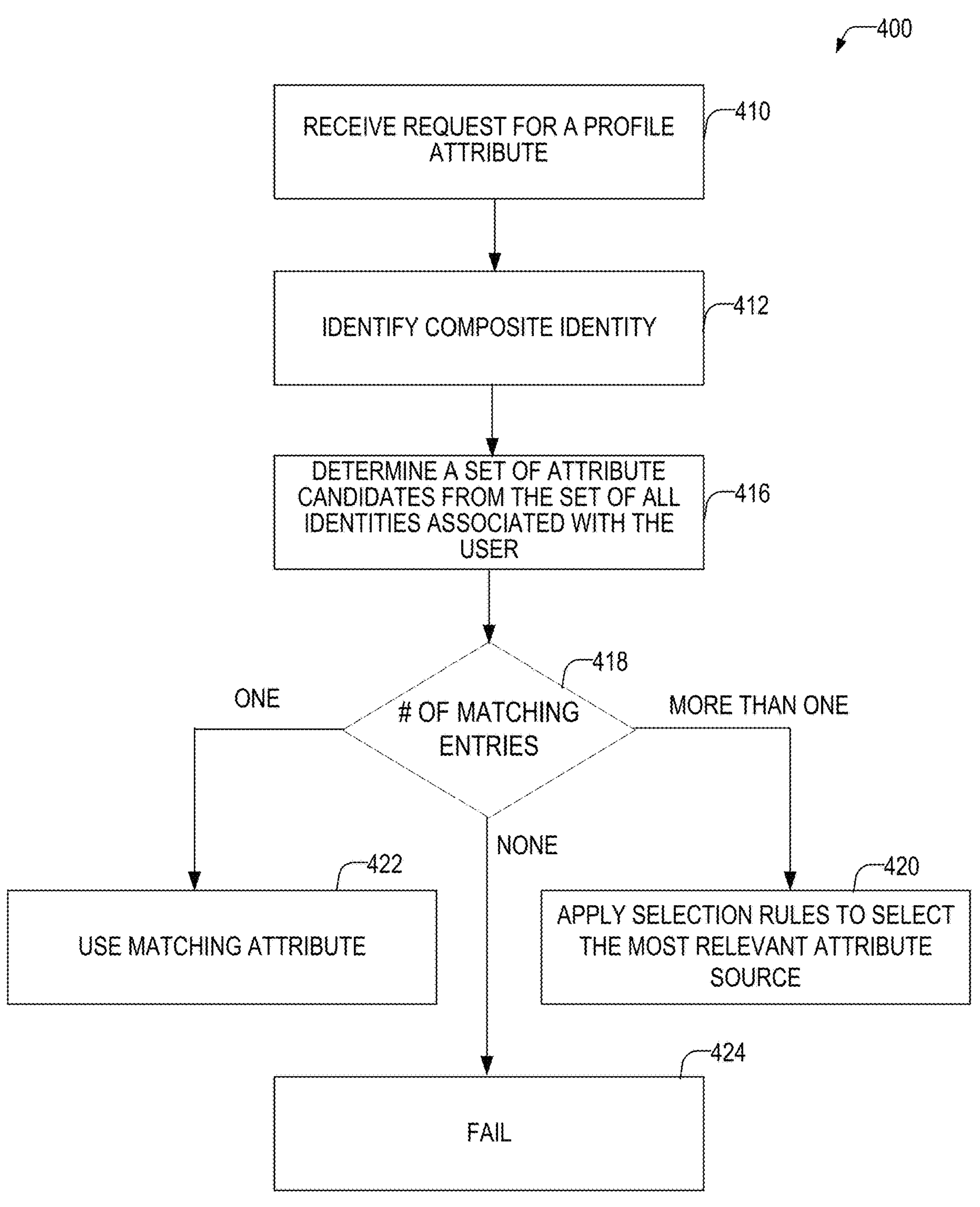
FIG. 4 shows a flowchart of a method of consolidating profile attributes for display according to some examples of the present disclosure.

FIG. 4 shows a flowchart of a method 400 of consolidating profile attributes according to some examples of the present disclosure. At operation 410, the method begins with receiving a request for a profile attribute. In some examples, the profile attributes may be displayed in a UI of the network-based service and the request may be for a profile of a user. At operation 412, the system identifies if there is a composite identity data structure for this user. As previously described, the composite identity data structure aggregates multiple digital identities that represent the same human user across different tenants or systems. The composite identity data structure may be identified using one or more attributes in one or more profiles linked through the composite identity data structure or may be identified based upon one or more of the accounts linked in the composite identity data structure. That is, the account to which the profile data is requested may be used as an index to find a composite identity data structure. If there is a composite identity data structure, then processing continues with operation 416, if there is not a composite identity data structure, then the profile attributes in the account to which the profile data is requested are returned. In some examples, the request at operation 410 may be for multiple profile attributes of a user profile, in which case operations 416, 418, 422, 420, and 422 may be repeated for each attribute.

At operation 416, the system determines a set of attribute candidates from the set of all identities associated with the user for the requested attribute. This step involves identifying all possible sources for the requested attribute from the different identities within the composite identity data structure. At operation 418, the system checks the number of matching entries. This decision point evaluates whether there is one, none, or more than one matching attribute candidate for the requested profile attribute. If there is one matching entry, at operation 422, the system uses the matching attribute. If there are more than one matching entries, at operation 420, the system applies per-attribute selection rules to select the most relevant attribute source. This step involves using predefined logic rules to determine the most appropriate attribute source based on factors such as policies, timestamps, or other relevance criteria.

The selection rules applied at operation 420 may be used to determine the most relevant attribute source when multiple matching entries exist. These rules ensure that the system selects the most appropriate attribute based on various contextual factors. For instance, rules associated with the determined resources may prioritize attributes based upon the specific attributes themselves. For example, if a resource is a picture of a user, the rule may select the most recent picture. Rules associated with a tenant of the first user may prioritize attributes based on the policies and preferences of the tenant to which the first user belongs. For example, if the first user's tenant has a policy that mandates the use of a corporate email address, the system will prioritize this attribute over others. Similarly, rules associated with a tenant of the second user, who is viewing the profile, may prioritize attributes based on the policies and preferences of the second user's tenant. For instance, if the second user's tenant prefers to display job titles from the original identity, the system will select this attribute accordingly. The identity of the second user viewing the profile also plays a role; for example, if the second user is an administrator, the system may prioritize attributes that provide more detailed information, such as last login time or device compliance status.

Within the different categories of rules (e.g., attribute-based rules, tenant-based rules, etc . . . ) there may be different factors the rules consider. For example, time-based rules ensure that the most recent information is displayed. For example, if two identities have different profile pictures, the system will select the one with the most recent update time. Policy-based rules may dictate which attributes should be displayed based on security, compliance, or organizational guidelines. For instance, if a policy requires that only verified email addresses be shown, the system will prioritize this attribute over others. These logic rules collectively ensure that the most relevant and accurate attributes are selected for display, enhancing the user experience and maintaining compliance with organizational policies.

One or more of these rules may be used to select the attributes. In some examples, some classes of rules may be prioritized over other classes. For example, tenant-policies may override attribute specific rules. These rules may thus be organized in a decision tree to select the most appropriate attribute.

If there are no matching entries, at operation 424, the system fails. This step indicates that the system could not find a suitable attribute candidate for the requested profile attribute, resulting in a failure to display the attribute. After the method 400, one or more of the selected attributes may be displayed, or caused to be displayed to a user.

Figure 5:
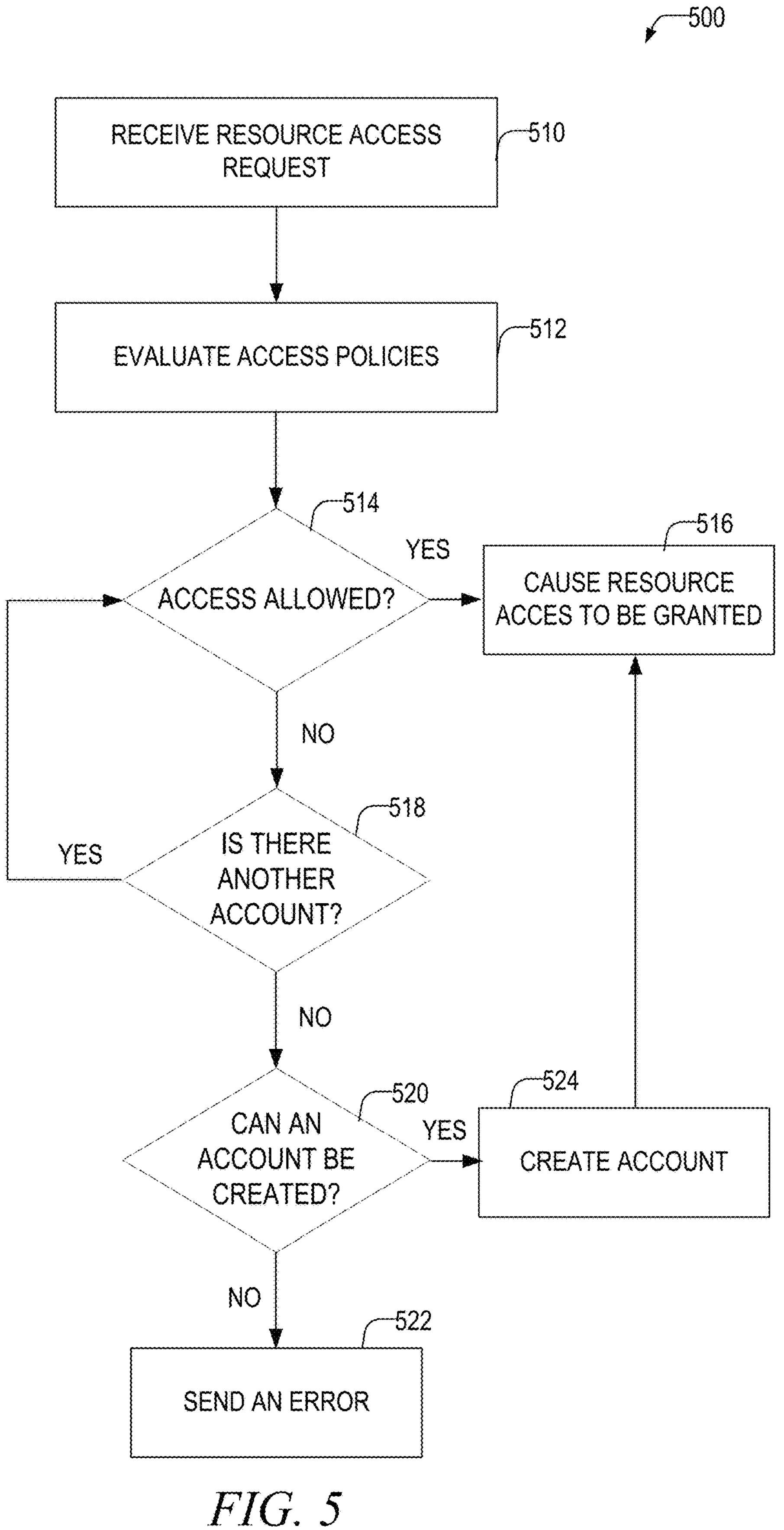
FIG. 5 shows a flowchart of a method of using the composite identity structure to determine an account to access a resource according to some examples of the present disclosure.

FIG. 5 shows a flowchart of a method 500 of using the composite identity structure to determine an account to access a resource according to some examples of the present disclosure. At operation 510, the method begins with receiving a resource access request. At operation 512, the system evaluates access policies to determine if the current account of the user to receive access to the resources is authorized to access the resources. The evaluation includes checking access permissions, compliance with security policies, and any other relevant criteria that govern resource sharing. At operation 514, the system determines whether access is allowed. If sharing is allowed, the system proceeds to operation 516. At operation 516, the system causes access to be granted. For example, the system sends a sharing link that grants access to the resource.

If access is not allowed, the system proceeds to operation 518, where it checks if there is another account. This step involves locating the composite identity structure for the user of the account and using it to identify if there is another account associated with the user that might have the necessary permissions to access the resource. If another account is found, the method loops back to operation 512 to evaluate policies for the newly identified account.

If no other account is found, the system proceeds to operation 520, where it determines if an account can be created. This decision point evaluates whether provisioning a new account is possible that would allow access to the resource. If account creation is feasible, the system proceeds to operation 524. At operation 524, the system creates the account. This step involves provisioning a new account within the composite identity structure that meets the necessary criteria for accessing the resource.

If account creation is not possible, the system proceeds to operation 522, where it sends an error. This step involves notifying the user or the requesting application that the resource cannot be shared due to policy restrictions or the absence of a suitable account.

The method 500 ensures that resource sharing is conducted in compliance with access policies and leverages the composite identity structure to find or create suitable accounts for accessing the resource. This approach enhances security and simplifies the management of access permissions in multi-tenant environments.

In some examples, causing access to be granted to the resource at operation 516 comprises sending an indication to a client device telling the client device which account to use to access the resource.

Figure 6:
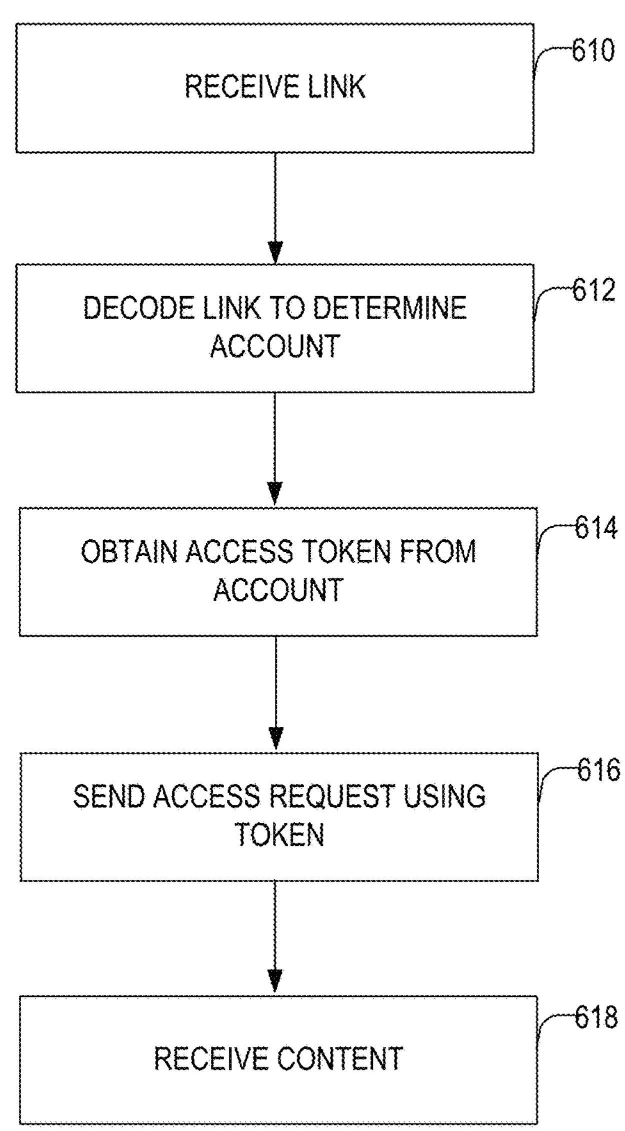
FIG. 6 shows a flowchart of a method of a client device using a proxy account to obtain access to a resource of a tenant according to some examples of the present disclosure.

FIG. 6 shows a flowchart of a method 600 of a client device using a proxy account to obtain access to a resource of a tenant according to some examples of the present disclosure. Method 600 is a method whereby the network-based service tells the client which account to use.

At operation 610, the method begins with receiving a resource access link. This operation involves the client device receiving a link that is intended to provide access to a resource within a tenant. The link may be shared through various means such as email, messaging applications, or directly within a collaboration platform. At operation 612, the method proceeds with decoding the link to determine the account that should be used to access the resource. This operation involves the client device analyzing the received link to extract information about the account that is used to access the resource. The decoding process may involve parsing the link to identify embedded tokens or identifiers that specify the appropriate proxy account. In some examples, the account to use is provided in the sharing link, but in other examples, a separate message (e.g., after the link is utilized) may be sent.

At operation 614, the method continues with obtaining an access token associated with the account specified in the link. This operation involves the client device using the information decoded from the link to request an access token from the specified account or to find an already provisioned access token from the specified account. The access token serves as a credential that authorizes the client device to access the resource within the tenant. At operation 616, the client sends an access request for the resource using the token. This operation involves the client device sending a request to access the resource, including the obtained access token as part of the request. The access token is used to authenticate the request and verify that the client device has the necessary permissions to access the resource. At operation 618, the method concludes with receiving the content. This operation involves the client device receiving the requested content from the resource within the tenant. The content may include files, documents, or other data.

Figure 7:
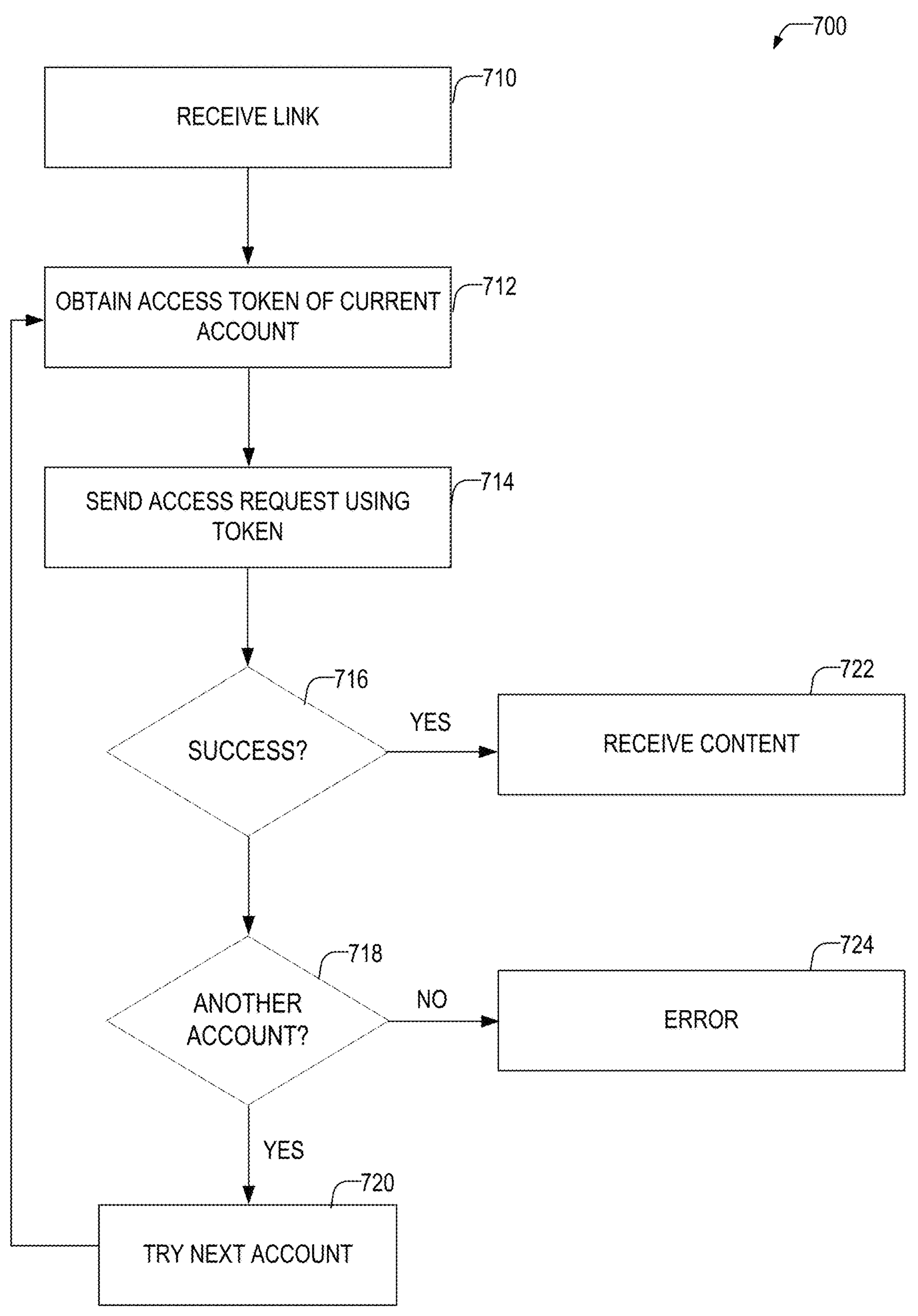
FIG. 7 shows a flowchart of a method of a client device using a proxy account to obtain access to a resource of a tenant according to some examples of the present disclosure.

FIG. 7 shows a flowchart of a method 700 of a client device using a proxy account to obtain access to a resource of a tenant according to some examples of the present disclosure. Method 700 is a method whereby the network-based service does not tell the client which account to use. In these examples, the client tries different accounts until access is granted. At operation 710, the method begins with receiving a resource access link. This step involves the client device receiving a link that is intended to provide access to a resource within a tenant. The link may be shared through various means such as email, messaging applications, or directly within a collaboration platform.

At operation 712, the method proceeds with obtaining an access token of the current account. At operation 714, the client sends an access request using the token. This operation involves the client device sending a request to access the resource, including the obtained access token as part of the request. The access token is used to authenticate the request and verify whether the client device has the necessary permissions to access the resource.

At operation 716, the method evaluates the success of the access request. This decision point checks whether the access request using the current account's token was successful. If the access request is successful, the method proceeds to operation 722. At operation 722, the client device receives the content. This operation involves the client device receiving the requested content from the resource within the tenant. The content may include files, documents, or other data.

If the access request is not successful, the method proceeds to operation 718, where the system checks if there is another account. This step involves determining whether there are additional accounts associated with the user that might have the necessary permissions to access the resource. For example, the client may also have access to the aggregated profile. If another account is found, the method proceeds to operation 720, where the client device tries the next account. This operation involves the client device obtaining an access token for the next account and sending another access request using the new token. The method then loops back to operation 714 to send the access request using the new token.

If no other account is found, the method proceeds to operation 724, where the system sends an error. This step involves notifying the user or the requesting application that the resource cannot be accessed due to policy restrictions or the absence of a suitable account.

Figure 8:
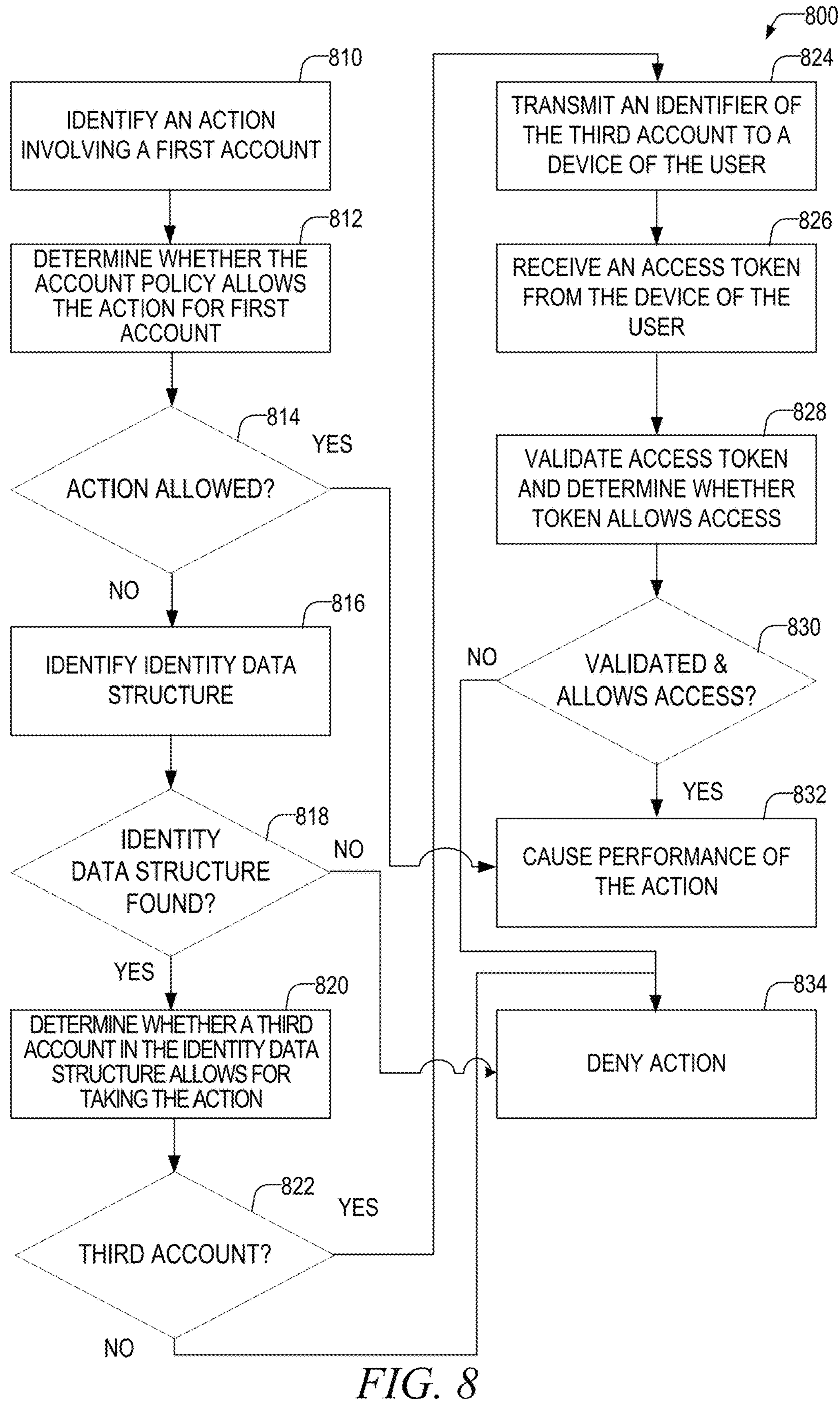
FIG. 8 shows a flowchart of a method of access management in a network-based service according to some examples of the present disclosure.

FIG. 8 shows a flowchart of a method 800 of access management in a network-based service according to some examples of the present disclosure. At operation 810, the method begins with identifying an action involving a first account. This step involves recognizing a specific action that a user intends to perform using the first account within the network-based service. Example actions include accessing resources of the network-based service, such as content, communications, or compute resources. In some examples, the first account is a proxy account for another account on another tenant than the tenant to which the first account is to be granted access to one or more resources.

At operation 812, the system determines whether the account policy allows the action for the first account. This step involves evaluating the policies associated with the first account to ascertain if the action is permissible under the current policy settings for a type of account of the first account. At decision point 814, the system checks if the action is allowed. If the action is allowed, the method proceeds to operation 832, where the system causes the performance of the action. If the action is not allowed, the method proceeds to operation 816. At operation 816, the system identifies whether an identity data structure exists that corresponds to the first account. This step involves searching for a composite identity data structure that corresponds to the user of the first account. The identity data structure aggregates multiple digital identities representing the same user. As noted, in some examples, the first account, or an identifier of the first account may be used as an index into a database of identity data structures.

At decision point 818, the system checks if an identity data structure is found. If the identity data structure is not found, the method proceeds to operation 834, where the system denies the action. For example, the system denies access to the resource. If the identity data structure is found, the method proceeds to operation 820. At operation 820, the system determines whether a second account in the identity data structure allows for taking the action. This step involves evaluating the policies associated with the second account to determine if the action can be performed using this account.

At decision point 822, the system checks if the second account allows for taking the action. If the second account does not allow for taking the action, the method proceeds to operation 834, where the system denies the action. If the second account allows for taking the action, the method proceeds to operation 824.

At operation 824, the system transmits an identifier of the second account to a device of the user. This step involves sending information about the second account to the user's device, indicating that this account be used to perform the action. At operation 826, the system receives an access token from the device of the user. This step involves the user's device sending an access token associated with the second account back to the system.

At operation 828, the system validates the access token and determines whether the token allows access. This step involves verifying the authenticity and validity of the access token to ensure the access token grants the necessary permissions to perform the action. At decision point 830, the system checks if the received token is validated and allows access. If the token is validated and allows access, the method proceeds to operation 832, where the system causes the performance of the action. If the token is not validated or does not allow access, the method proceeds to operation 834, where the system denies the action. At operation 832, the system causes the performance of the action. This step involves executing the action that the user intended to perform using the validated access token. At operation 834, the system denies the action. This step involves rejecting the user's request to perform the action due to policy restrictions or invalid access tokens.

Figure 9:
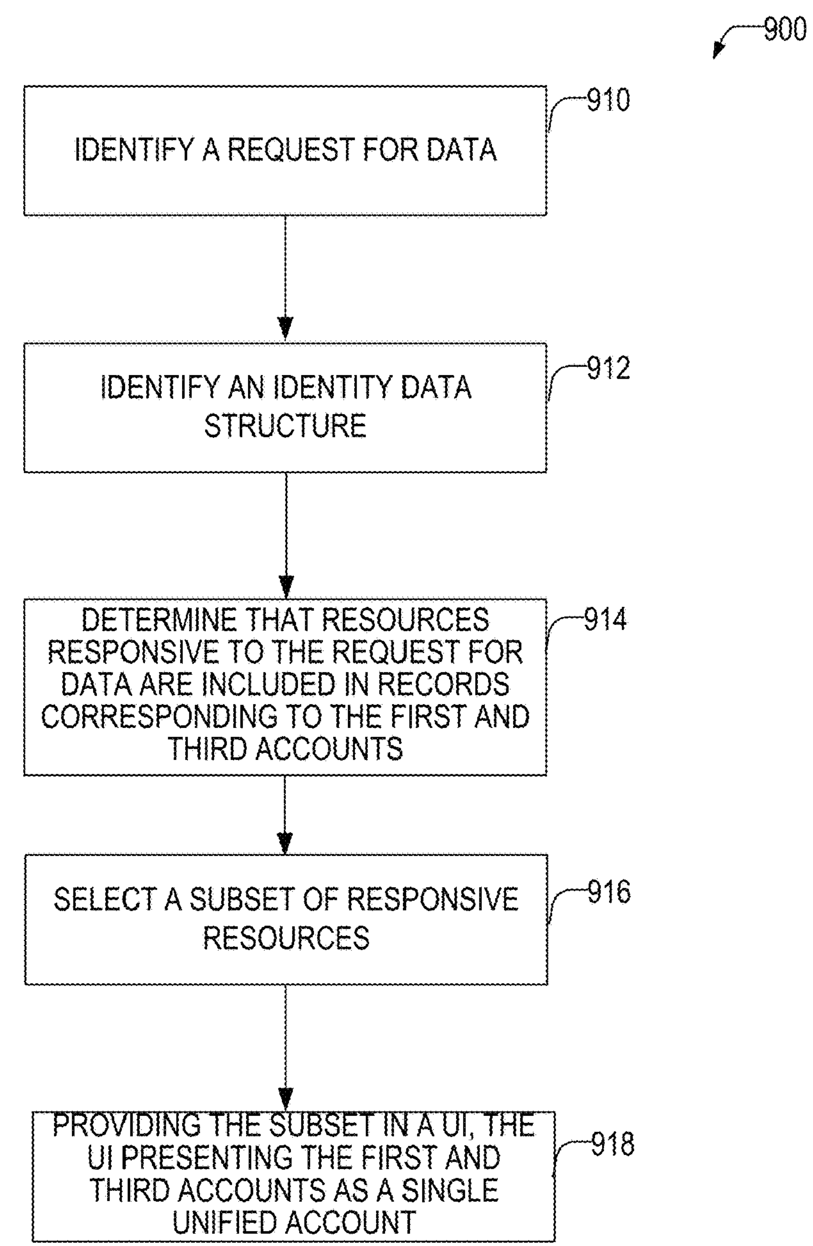
FIG. 9 shows a flowchart of a method for access management in a network-based service according to some examples of the present disclosure.

FIG. 9 shows a flowchart of a method 900 for access management in a network-based service. The method 900 begins with identifying a request for data at operation 910. This step involves recognizing a request for data originating from a second user, where the data pertains to a first user account of a first user. The method 900 proceeds with identifying an identity data structure at operation 912. This step involves determining that an identity data structure exists that corresponds to the first user. The identity data structure links the first account and a second account of the first user, where the first and second accounts are different account types. The next step involves determining that resources responsive to the request for data are included in records corresponding to the first and second accounts at operation 914. This step involves evaluating the records associated with both the first and second accounts to identify resources that are responsive to the request for data.

The method 900 continues with selecting a subset of responsive resources at operation 916. This step involves applying selection rules to choose a subset of the resources that are responsive to the request for data. As noted, the selection rules may be rules specific to the resources themselves, rules related to one or more tenants, and/or the like. There may be multiple rules applied to each resource. Rules may be evaluated in a specified order that weights or prioritizes certain types of rules differently. The final step involves providing the subset in a user interface at operation 918. The user interface presents the first and second accounts as a single unified account. This step ensures that the second user sees a coherent and unified representation of the first user's accounts, simplifying the user experience and reducing confusion.

The selection rules or criteria applied in the composite identity data structure may be used for determining the most relevant attributes and resources to display when conflicting attributes from multiple user profiles are involved. These rules help ensure that the system selects the most appropriate data based on various contextual factors, thereby improving the user experience and maintaining compliance with organizational policies. One set of selection rules is associated with the determined resources. For example, if a resource being accessed has specific requirements or preferences for certain attributes, those rules will take precedence. For instance, if a resource requires a particular security clearance level, the system will select the attribute from the identity that meets this requirement. Similarly, if a resource needs the most recent update, the system will prioritize the identity with the latest timestamp for that attribute.

Another set of rules is associated with the tenant of the first user. These rules may prioritize attributes based on the policies and preferences of the tenant to which the first user belongs. For example, if the first user's tenant has a policy that mandates the use of a corporate email address, the system will prioritize this attribute over others. Additionally, if the tenant has specific compliance requirements, such as multi-factor authentication (MFA) or device compliance, the system will select attributes that meet these criteria.

Similarly, rules associated with the tenant of the second user, who is viewing the profile, may prioritize attributes based on the policies and preferences of the second user's tenant. For instance, if the second user's tenant prefers to display job titles from the original identity, the system will select this attribute accordingly. The identity of the second user viewing the profile also plays a role; for example, if the second user is an administrator, the system may prioritize attributes that provide more detailed information, such as last login time or device compliance status.

Timestamp-based rules ensure that the most recent information is displayed. For example, if two identities have different profile pictures, the system will select the one with the most recent update time. This approach helps ensure that users and administrators have access to the most up-to-date information, enhancing the accuracy and relevance of the displayed data.

Policy-based rules may dictate which attributes should be displayed based on security, compliance, or organizational guidelines. For instance, if a policy requires that only verified email addresses be shown, the system will prioritize this attribute over others. These rules help ensure that the displayed data complies with organizational policies and enhances the overall security and integrity of the system.

In addition to these rules, the system may also apply logic rules to determine the most relevant attribute source when multiple matching entries exist. These logic rules collectively help ensure that the most relevant and accurate attributes are selected for display, improving the user experience and maintaining compliance with organizational policies. For example, the system may recognize that identity A is derived from identity B and "punch through" the attributes of identity A to read from identity B instead. Alternatively, the system may recognize that identity A has fresher information than identity B based on the last update time and select the most recent profile picture.

Figure 10:
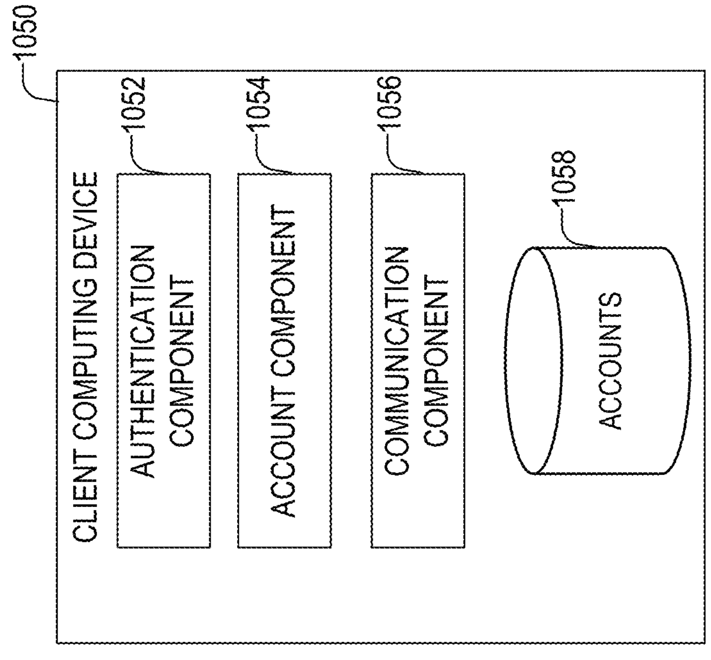
FIG. 10 shows logical diagrams of a network-based service and a client computing device according to some examples of the present disclosure.
Figure 10:
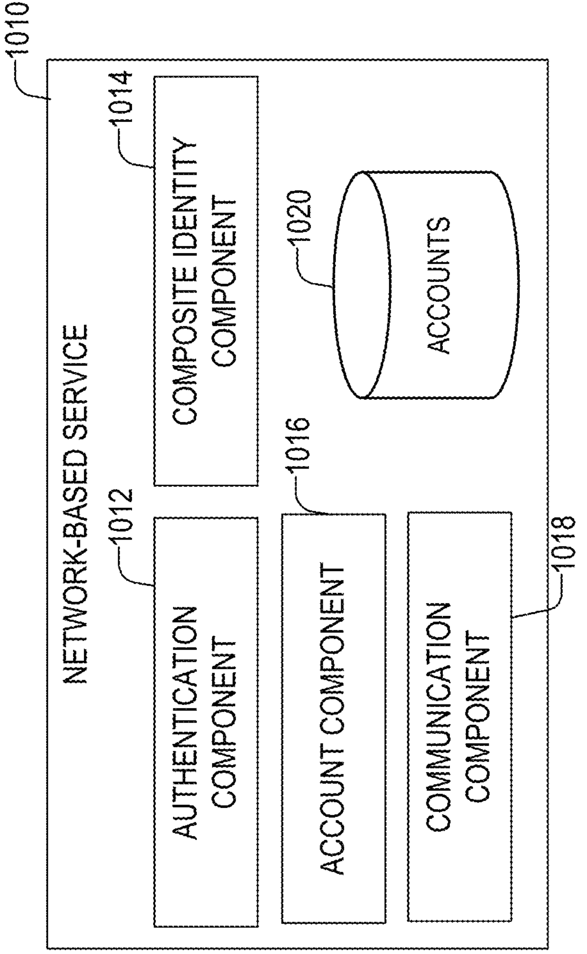

FIG. 10 shows logical diagrams of a network-based service 1010 and a client computing device 1050 according to some examples of the present disclosure. The network-based service 1010 includes an authentication component 1012, a composite identity component 1014, an account component 1016, a communication component 1018, and accounts component 1016. The authentication component 1012 manages the authentication of users attempting to access the network-based service 1010. The composite identity component 1014 handles the creation and management of composite identity data structures, which aggregate multiple digital identities representing the same user. The account component 1016 manages user accounts within the network-based service 1010, including the creation, modification, and deletion of accounts. The communication component 1018 facilitates communication between the network-based server and client devices as well as communications between users within the network-based service 1010, enabling features such as messaging, video conferencing, and file sharing. The accounts component 1016 manages user accounts, including authentication credentials, profile attributes, and access permissions. Accounts component 1016 may also create accounts. Accounts component 1016 stores account information in the accounts datastore 1020.

The client computing device 1050 includes an authentication component 1052, an account component 1054, a communication component 1056, and accounts datastore 1058. The authentication component 1052 manages the authentication of accounts on the client computing device 1050 with the network-based service 1010. The account component 1054 handles the management of user accounts on the client computing device 1050, including synchronization with the network-based service 1010. The communication component 1056 facilitates communication between the client computing device 1050 and the network-based service 1010, as well as other client devices, enabling features such as messaging, video conferencing, and file sharing. The accounts datastore 1058 stores information related to user accounts on the client computing device 1050, including authentication credentials, profile attributes, and access permissions.

The network-based service 1010 and the client computing device 1050 work together to provide a seamless and secure user experience. The authentication components 1012 and 1052 ensure that users are properly authenticated before accessing resources. The composite identity component 1014 in the network-based service 1010 manages composite identities, allowing users to access resources across multiple tenants without confusion or redundancy. The account components 1016 and 1054 manage user accounts, ensuring that account information is consistent and up-to-date across both the network-based service 1010 and the client computing device 1050. The communication components 1018 and 1056 facilitate communication between users, enabling collaboration and information sharing. The accounts datastore 1020 and 1058 store user account information, ensuring that authentication credentials, profile attributes, and access permissions are properly managed and synchronized.

When a user attempts to perform an action involving a first account, the authentication component 1012 of the network-based service 1010 identifies the action and evaluates whether the account policy allows it. If the policy forbids the action, the authentication component 1012 consults with the composite identity component 1014 to identify an identity data structure corresponding to the user. The composite identity component 1014 searches for a composite identity data structure that links the first account with other accounts of the user. If such a structure is found, the authentication component 1012 determines whether any of the linked accounts allow the action. If a suitable account is identified, the communication component 1018 of the network-based service 1010 transmits an identifier of this account to the user's device.

The client computing device 1050, equipped with its own authentication component 1052, receives the identifier and selects an access token associated with the identified account from the accounts data store 1058. This token is then transmitted back to the network-based service 1010. The authentication component 1012 of the network-based service 1010 validates the access token to ensure it grants the necessary permissions for the action.

If the token is validated, the network-based service 1010 proceeds to perform the action. If the token is not validated or no suitable account is found, the system either utilizes the accounts component 1016 to create an account that allows the action, or denies the action. Throughout this process, the account components 1016 and 1054 of both the network-based service 1010 and the client computing device 1050 manage the creation, modification, and synchronization of user accounts, ensuring that the composite identity structure remains accurate and up-to-date. The communication components 1018 and 1056 facilitate the exchange of information between the network-based service 1010 and the client computing device 1050, enabling seamless collaboration and access management. The accounts components 1016 and 1054 control and synchronize user account information, ensuring consistency and accuracy across the system. The account information is stored in accounts datastores 1020 and 1058.

In some examples, accounts may be linked within a composite identity data structure such that multiple digital identities representing the same user are accurately aggregated. One example method to link disparate accounts is by recording the "original" identity that was used when creating a "shadow" or proxy identity for a user. For example, when a user from Tenant A is invited to access resources in Tenant B, a shadow account is created in Tenant B. By recording the original identity from Tenant A, the system can establish a link between the original and shadow accounts, thereby forming part of the composite identity data structure.

Another method involves matching specific attributes across different accounts. Common attributes such as email addresses, phone numbers, or internet protocol (IP) addresses can be used to identify and link accounts that belong to the same user. For instance, if a user has multiple accounts with the same email address across different tenants, the system can use this attribute to link these accounts into a single composite identity.

Just-in-time (JIT) account provisioning is another technique used to link disparate accounts. When a user attempts to access a resource that their current accounts do not allow, the system can automatically create a new account that meets the necessary criteria. This new account is then linked to the existing composite identity data structure, ensuring seamless access to the resource without user intervention.

Overall, the process of linking disparate accounts into a composite identity data structure involves a combination of recording original identities, matching specific attributes, applying heuristics and logic rules, and utilizing JIT account provisioning. These methods collectively ensure that multiple digital identities representing the same user are accurately aggregated, providing a unified and coherent representation of the user across different tenants and resources.

Figure 11:
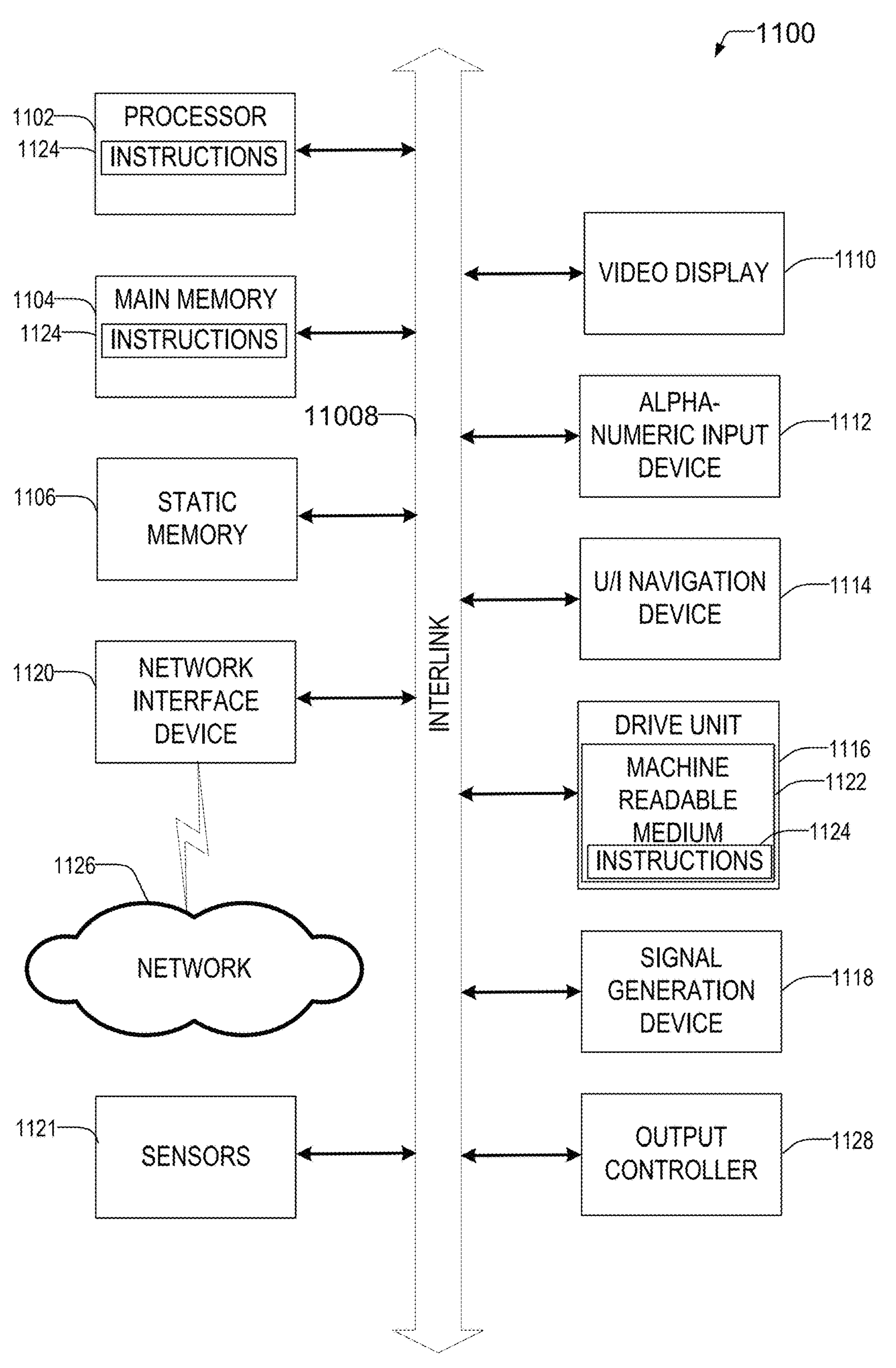
FIG. 11 illustrates a block diagram of an example machine upon which any one or more of the techniques (e.g., methodologies) discussed herein may perform according to some examples of the present disclosure.

FIG. 11 illustrates a block diagram of an example machine 11000 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 1100 may be used to implement the environment shown in FIG. 1, including implementing the network-based service; the GUIs of FIGS. 2 and 3; implement the methods of FIG. 4-9; and be configured to include the components of FIG. 10.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120. The Machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

OTHER NOTES AND EXAMPLES

Example 1 is a method for access management in a network-based service, the method comprising: identifying, at a server of the network-based service, an action involving a first account used by a user to access resources; determining, at the server of the network-based service, that an account policy of the network-based service forbids performing the action for an account type of the first account, and in response: identifying, at the server of the network-based service, an identity data structure corresponding to the user, the identity data structure identified using information from the first account, the identity data structure linking the first account with a second account, the second account of a different type of account than the first account; determining, at the server of the network-based service, according to the policy, that the second account referenced in the identity data structure allows for taking the action; sending, at the server of the network-based service, a transmission to a device of the user via the first account of the user, the transmission identifying the second account; receiving, at the device of the user, the transmission; selecting, at the device of the user, an access token associated with the second account to complete the action, the access token selected by the device of the user from a plurality of access tokens held by the device, the access token signifying that the user is authenticated on the second account; transmitting, at the device of the user, the access token to the server of the network-based service; receiving, at the server of the network-based service, the access token from the device of the user; and responsive to the server of the network-based service validating that the access token received from the device of the user is valid and allows the action, the server causing performance of the action involving the user.

In Example 2, the subject matter of Example 1 includes, wherein the identity data structure includes different account types that are required to access different actions within a first tenant.

In Example 3, the subject matter of Examples 1-2 includes, at the server of the network-based service: responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

In Example 4, the subject matter of Examples 1-3 includes, at the server of the network-based service: creating the identity data structure with the first account and the second account by matching an attribute of the first account with a same attribute of the second account.

In Example 5, the subject matter of Example 4 includes, wherein the attribute is one of: an email address, a phone number, or an internet protocol address.

In Example 6, the subject matter of Examples 1-5 includes, at the server of the network-based service: identifying that the second account was created based upon the first account, and in response, creating the identity data structure associating the first and second accounts.

In Example 7, the subject matter of Examples 1-6 includes, wherein the action is sharing content.

In Example 8, the subject matter of Examples 1-7 includes, identifying, in the network-based service, a first action and a second action associated with a first tenant, the first action requiring a first privilege level and the second action requiring a second privilege level; determining that the first account does not have the first privilege level to perform the first action; identifying that the second account has the second privilege level to perform the first action; sending a transmission to the first account of the user, the transmission causing a computing device of the user to utilize an associated token of the second account to perform the first action; determining that the first and second accounts do not have the required privilege level to perform the second action; identifying, in the identity data structure, a third account that has the required privilege level to perform the second action; sending a transmission to the first account of the user, the transmission causing the computing device of the user to utilize an associated token of the third account to perform the second action; and determining that if the third account is not included in the identity data structure, the user cannot perform the second action.

Example 9 is a computing device for access management in a network-based service, the computing device comprising: a hardware processor; a memory, the memory storing instructions, which when executed by the hardware processor cause the computing device to perform operations comprising: identifying an action involving a first account used by a user to access resources; determining that an account policy of the network-based service forbids performing the action for an account type of the first account, and in response: identifying an identity data structure corresponding to the user, the identity data structure identified using information from the first account, the identity data structure linking the first account with a second account, the second account of a different type of account than the first account; determining, according to the policy, that the second account referenced in the identity data structure allows for taking the action; sending a transmission to a device of the user via the first account of the user, the transmission identifying the second account; receiving the transmission at the device of the user; selecting an access token associated with the second account to complete the action, the access token selected by the device of the user from a plurality of access tokens held by the device, the access token signifying that the user is authenticated on the second account; transmitting the access token to the server of the network-based service; receiving the access token from the device of the user; and responsive to validating that the access token received from the device of the user is valid and allows the action, causing performance of the action involving the user.

In Example 10, the subject matter of Example 9 includes, wherein the identity data structure includes different account types that are required to access different actions within a first tenant.

In Example 11, the subject matter of Examples 9-10 includes, wherein the operations further comprise: responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

In Example 12, the subject matter of Examples 9-11 includes, wherein the operations further comprise: creating the identity data structure with the first account and the second account by matching an attribute of the first account with a same attribute of the second account.

In Example 13, the subject matter of Example 12 includes, wherein the attribute is one of: an email address, a phone number, or an internet protocol address.

In Example 14, the subject matter of Examples 9-13 includes, wherein the operations further comprise: identifying that the second account was created based upon the first account, and in response, creating the identity data structure associating the first and second accounts.

In Example 15, the subject matter of Examples 9-14 includes, wherein the action is sharing content.

In Example 16, the subject matter of Examples 9-15 includes, wherein the operations further comprise: identifying a first action and a second action associated with a first tenant, the first action requiring a first privilege level and the second action requiring a second privilege level; determining that the first account does not have the first privilege level to perform the first action; identifying that the second account has the second privilege level to perform the first action; sending a transmission to the first account of the user, the transmission causing a computing device of the user to utilize an associated token of the second account to perform the first action; determining that the first and second accounts do not have the required privilege level to perform the second action; identifying, in the identity data structure, a third account that has the required privilege level to perform the second action; sending a transmission to the first account of the user, the transmission causing the computing device of the user to utilize an associated token of the third account to perform the second action; and determining that if the third account is not included in the identity data structure, the user cannot perform the second action.

Example 17 is a machine-readable medium, storing instructions for access management in a network-based service, the instructions, which when executed, cause the machine to perform operations comprising: identifying an action involving a first account used by a user to access resources; determining that an account policy of the network-based service forbids performing the action for an account type of the first account, and in response: identifying an identity data structure corresponding to the user, the identity data structure identified using information from the first account, the identity data structure linking the first account with a second account, the second account of a different type of account than the first account; determining, according to the policy, that the second account referenced in the identity data structure allows for taking the action; sending a transmission to a device of the user via the first account of the user, the transmission identifying the second account; receiving the transmission at the device of the user; selecting an access token associated with the second account to complete the action, the access token selected by the device of the user from a plurality of access tokens held by the device, the access token signifying that the user is authenticated on the second account; transmitting the access token to the server of the network-based service; receiving the access token from the device of the user; and responsive to validating that the access token received from the device of the user is valid and allows the action, causing performance of the action involving the user.

In Example 18, the subject matter of Example 17 includes, wherein the identity data structure includes different account types that are required to access different actions within a first tenant.

In Example 19, the subject matter of Examples 17-18 includes, wherein the operations further comprise: responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

In Example 20, the subject matter of Examples 17-19 includes, wherein the operations further comprise: creating the identity data structure with the first account and the second account by matching an attribute of the first account with a same attribute of the second account.

In Example 21, the subject matter of Example 20 includes, wherein the attribute is one of: an email address, a phone number, or an internet protocol address.

In Example 22, the subject matter of Examples 17-21 includes, wherein the operations further comprise: identifying that the second account was created based upon the first account, and in response, creating the identity data structure associating the first and second accounts.

In Example 23, the subject matter of Examples 17-22 includes, wherein the action is sharing content.

In Example 24, the subject matter of Examples 17-23 includes, wherein the operations further comprise: identifying a first action and a second action associated with a first tenant, the first action requiring a first privilege level and the second action requiring a second privilege level; determining that the first account does not have the first privilege level to perform the first action; identifying that the second account has the second privilege level to perform the first action; sending a transmission to the first account of the user, the transmission causing a computing device of the user to utilize an associated token of the second account to perform the first action; determining that the first and second accounts do not have the required privilege level to perform the second action; identifying, in the identity data structure, a third account that has the required privilege level to perform the second action; sending a transmission to the first account of the user, the transmission causing the computing device of the user to utilize an associated token of the third account to perform the second action; and determining that if the third account is not included in the identity data structure, the user cannot perform the second action.

Example 25 is a method for access management in a network-based service, the method comprising: identifying a request for data of a first user account of a first user, the request for data originating from a second user; identifying, based upon the first user account, an identity data structure exists that corresponds to the first user and links the first account and a second account, the identity data structure comprising information about the first account and a second account of the first user, the first and second accounts different account types; determining that resources responsive to the request for data are included in records corresponding to both the first and second accounts; selecting a subset of the resources responsive to the request for data based upon selection rules; and providing the subset in a user interface provided to the second user, the user interface presenting the first and second accounts as a single unified account responsive to identifying the identity data structure.

In Example 26, the subject matter of Example 25 includes, wherein the resource is one of: an availability status of the first user or profile information of the first user.

In Example 27, the subject matter of Examples 25-26 includes, wherein the request for data comprises one of: a search for users wherein the first user matches search terms entered by the second user, or display of a user profile of the first user.

In Example 28, the subject matter of Examples 25-27 includes, identifying that the first account and the second account correspond to the first user based upon information in account profiles of the first and second accounts, and in response, creating the identity data structure.

In Example 29, the subject matter of Examples 25-28 includes, wherein the rules consider protocol support for accessing the resource.

In Example 30, the subject matter of Examples 25-29 includes, wherein the selected resources are one or more of: files; documents; communication history; calendar information; scheduling information; application data; or location data.

In Example 31, the subject matter of Examples 28-30 includes, wherein the selection rules comprise one or more of: rules associated with the determined resources, rules associated with a tenant of the first user, rules associated with a tenant of the second user, or an identity of the second user.

Example 32 is a computing device for access management in a network-based service, the computing device comprising: a hardware processor; a memory, the memory storing instructions, which when executed by the hardware processor cause the computing device to perform operations comprising: identifying a request for data of a first user account of a first user, the request for data originating from a second user; identifying, based upon the first user account, an identity data structure exists that corresponds to the first user and links the first account and a second account, the identity data structure comprising information about the first account and a second account of the first user, the first and second accounts different account types; determining that resources responsive to the request for data are included in records corresponding to both the first and second accounts; selecting a subset of the resources responsive to the request for data based upon selection rules; and providing the subset in a user interface provided to the second user, the user interface presenting the first and second accounts as a single unified account responsive to identifying the identity data structure.

In Example 33, the subject matter of Example 32 includes, wherein the resource is one of: an availability status of the first user or profile information of the first user.

In Example 34, the subject matter of Examples 32-33 includes, wherein the request for data comprises one of: a search for users wherein the first user matches search terms entered by the second user, or display of a user profile of the first user.

In Example 35, the subject matter of Examples 32-34 includes, wherein the operations further comprise: identifying that the first account and the second account correspond to the first user based upon information in account profiles of the first and second accounts, and in response, creating the identity data structure.

In Example 36, the subject matter of Examples 32-35 includes, wherein the rules consider protocol support for accessing the resource.

In Example 37, the subject matter of Examples 32-36 includes, wherein the selected resources are one or more of: files; documents; communication history; calendar information; scheduling information; application data; or location data.

In Example 38, the subject matter of Examples 35-37 includes, wherein the selection rules comprise one or more of: rules associated with the determined resources, rules associated with a tenant of the first user, rules associated with a tenant of the second user, or an identity of the second user.

Example 39 is a machine-readable medium, storing instructions for access management in a network-based service, the instructions, which when executed, cause the machine to perform operations comprising: identifying a request for data of a first user account of a first user, the request for data originating from a second user; identifying, based upon the first user account, an identity data structure exists that corresponds to the first user and links the first account and a second account, the identity data structure comprising information about the first account and a second account of the first user, the first and second accounts different account types; determining that resources responsive to the request for data are included in records corresponding to both the first and second accounts; selecting a subset of the resources responsive to the request for data based upon selection rules; and providing the subset in a user interface provided to the second user, the user interface presenting the first and second accounts as a single unified account responsive to identifying the identity data structure.

In Example 40, the subject matter of Example 39 includes, wherein the resource is one of: an availability status of the first user or profile information of the first user.

In Example 41, the subject matter of Examples 39-40 includes, wherein the request for data comprises one of: a search for users wherein the first user matches search terms entered by the second user, or display of a user profile of the first user.

In Example 42, the subject matter of Examples 39-41 includes, wherein the operations further comprise: identifying that the first account and the second account correspond to the first user based upon information in account profiles of the first and second accounts, and in response, creating the identity data structure.

In Example 43, the subject matter of Examples 39-42 includes, wherein the rules consider protocol support for accessing the resource.

In Example 44, the subject matter of Examples 39-43 includes, wherein the selected resources are one or more of: files; documents; communication history; calendar information; scheduling information; application data; or location data.

In Example 45, the subject matter of Examples 42-44 includes, wherein the selection rules comprise one or more of: rules associated with the determined resources, rules associated with a tenant of the first user, rules associated with a tenant of the second user, or an identity of the second user.

Example 46 is at least one machine-readable medium including instructions that, when executed by processing circuitry, cause the processing circuitry to perform operations to implement of any of Examples 1-45.

Example 47 is an apparatus comprising means to implement of any of Examples 1-45.

Example 48 is a system to implement of any of Examples 1-45.

Example 49 is a method to implement of any of Examples 1-45.

What is claimed is:

1. A method for access management in a network-based service, the method comprising:

identifying, at a server of the network-based service, an action involving a first account used by a user to access resources;

determining, at the server of the network-based service, that an account policy of the network-based service forbids performing the action for an account type of the first account, and in response:

identifying, at the server of the network-based service, an identity data structure corresponding to the user, the identity data structure identified using information from the first account, the identity data structure linking the first account with a second account, the second account of a different type of account than the first account;

determining, at the server of the network-based service, according to the account policy, that the second account referenced in the identity data structure allows for taking the action;

sending, at the server of the network-based service, a transmission to a device of the user via the first account of the user, the transmission identifying the second account;

receiving, at the device of the user, the transmission;

selecting, at the device of the user, an access token associated with the second account to complete the action, the access token selected by the device of the user from a plurality of access tokens held by the device, the access token signifying that the user is authenticated on the second account;

transmitting, at the device of the user, the access token to the server of the network-based service;

receiving, at the server of the network-based service, the access token from the device of the user; and responsive to the server of the network-based service validating that the access token received from the device of the user is valid and allows the action, the server causing performance of the action involving the user.

2. The method of claim 1, wherein the identity data structure includes different account types that are required to access different actions within a first tenant.

3. The method of claim 1, further comprising, at the server of the network-based service:

responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

4. The method of claim 1, further comprising, at the server of the network-based service:

creating the identity data structure with the first account and the second account by matching an attribute of the first account with a same attribute of the second account.

5. The method of claim 4, wherein the attribute is one of: an email address, a phone number, or an internet protocol address.

6. The method of claim 1, further comprising, at the server of the network-based service:

identifying that the second account was created based upon the first account, and in response, creating the identity data structure associating the first and second accounts.

7. The method of claim 1, wherein the action is sharing content.

8. The method of claim 1, further comprising:

identifying, in the network-based service, a first action and a second action associated with a first tenant, the first action requiring a first privilege level and the second action requiring a second privilege level;

determining that the first account does not have the first privilege level to perform the first action;

identifying that the second account has the second privilege level to perform the first action;

sending a transmission to the first account of the user, the transmission causing a computing device of the user to utilize an associated token of the second account to perform the first action;

determining that the first and second accounts do not have the required privilege level to perform the second action;

identifying, in the identity data structure, a third account that has the required privilege level to perform the second action;

sending a transmission to the first account of the user, the transmission causing the computing device of the user to utilize an associated token of the third account to perform the second action; and determining that if the third account is not included in the identity data structure, the user cannot perform the second action.

9. A computing device for access management in a network-based service, the computing device comprising:

a hardware processor;

a memory, the memory storing instructions, which when executed by the hardware processor cause the computing device to perform operations comprising:

identifying an action involving a first account used by a user to access resources;

determining that an account policy of the network-based service forbids performing the action for an account type of the first account, and in response:

identifying an identity data structure corresponding to the user, the identity data structure identified using information from the first account, the identity data structure linking the first account with a second account, the second account of a different type of account than the first account;

determining, according to the account policy, that the second account referenced in the identity data structure allows for taking the action;

sending a transmission to a device of the user via the first account of the user, the transmission identifying the second account;

receiving the transmission at the device of the user;

selecting an access token associated with the second account to complete the action, the access token selected by the device of the user from a plurality of access tokens held by the device, the access token signifying that the user is authenticated on the second account;

transmitting the access token to the server of the network-based service;

receiving the access token from the device of the user; and responsive to validating that the access token received from the device of the user is valid and allows the action, causing performance of the action involving the user.

10. The computing device of claim 9, wherein the identity data structure includes different account types that are required to access different actions within a first tenant.

11. The computing device of claim 9, wherein the operations further comprise:

responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

12. The computing device of claim 9, wherein the operations further comprise:

creating the identity data structure with the first account and the second account by matching an attribute of the first account with a same attribute of the second account.

13. The computing device of claim 12, wherein the attribute is one of: an email address, a phone number, or an internet protocol address.

14. The computing device of claim 9, wherein the operations further comprise:

identifying that the second account was created based upon the first account, and in response, creating the identity data structure associating the first and second accounts.

15. The computing device of claim 9, wherein the action is sharing content.

16. The computing device of claim 9, wherein the operations further comprise:

identifying a first action and a second action associated with a first tenant, the first action requiring a first privilege level and the second action requiring a second privilege level;

determining that the first account does not have the first privilege level to perform the first action;

identifying that the second account has the second privilege level to perform the first action;

sending a transmission to the first account of the user, the transmission causing a computing device of the user to utilize an associated token of the second account to perform the first action;

determining that the first and second accounts do not have the required privilege level to perform the second action;

identifying, in the identity data structure, a third account that has the required privilege level to perform the second action;

sending a transmission to the first account of the user, the transmission causing the computing device of the user to utilize an associated token of the third account to perform the second action; and determining that if the third account is not included in the identity data structure, the user cannot perform the second action.

17. A non-transitory machine-readable medium, storing instructions for access management in a network-based service, the instructions, which when executed, cause the machine to perform operations comprising:

identifying an action involving a first account used by a user to access resources;

determining that an account policy of the network-based service forbids performing the action for an account type of the first account, and in response:

identifying an identity data structure corresponding to the user, the identity data structure identified using information from the first account, the identity data structure linking the first account with a second account, the second account of a different type of account than the first account;

determining, according to the account policy, that the second account referenced in the identity data structure allows for taking the action;

sending a transmission to a device of the user via the first account of the user, the transmission identifying the second account;

receiving the transmission at the device of the user;

selecting an access token associated with the second account to complete the action, the access token selected by the device of the user from a plurality of access tokens held by the device, the access token signifying that the user is authenticated on the second account;

transmitting the access token to the server of the network-based service;

receiving the access token from the device of the user; and responsive to validating that the access token received from the device of the user is valid and allows the action, causing performance of the action involving the user.

18. The non-transitory machine-readable medium of claim 17, wherein the identity data structure includes different account types that are required to access different actions within a first tenant.

19. The non-transitory machine-readable medium of claim 17, wherein the operations further comprise:

responsive to determining that the account policy forbids performing the action for the account type of the first account, evaluating the account policy and an account creation policy to determine whether a different account type may be created for the user that is authorized to perform the action; and responsive to determining that the account policy and the account creation policy allows creation of the different account type, automatically creating the second account without user intervention.

20. The non-transitory machine-readable medium of claim 17, wherein the operations further comprise:

creating the identity data structure with the first account and the second account by matching an attribute of the first account with a same attribute of the second account.

* * * * *